Patented Jan. 15, 1952

2,582,868

UNITED STATES PATENT OFFICE 2,582,868

COMPOSITION AND PROCESS FOR COLORING CITRUS FRUIT

George J. Hausmann, Merchantville, N. J., and Bayard S. Johnson, Havertown, and Charles W. McDermott, Philadelphia, Pa., assignors to Franklin Research Company, Philadelphia, Pa., a corporation of Pennsylvania No Drawing. Application October 14, 1949, Serial No. 121,454

18 Claims. (Cl. 99—103)

1

This invention relates to improvements in the art of imparting additional color to citrus fruit and particularly to a novel non-aqueous concentrate for dilution with water to form an improved coloring bath for oranges and to the process of coloring oranges which includes the steps of preparing such a non-aqueous concentrate and then diluting the same with water to form a coloring bath.

Various compositions and methods have previously been employed in the fruit coloring art. One of the earliest compositions employed in the art is described in the United States patent to Harvey No. 1,909,860. The composition disclosed in the Harvey patent consists essentially of an oil soluble dye and an oleaginous solvent for the dye. This composition by itself is open to the objection that uniform distribution of the color over the surface of the fruit is very difficult to obtain with solvents of the type disclosed by Harvey under the conditions encountered in commercial use. Consequently the Harvey patent recommends that the dye solution be emulsified in water and advocates the use of wetting and emulsifying agents such as sodium and potassium soaps or triethanolamine soaps. While the use of such agents facilitates uniform distribution, there are many disadvantages which follow from the presence of soaps and the like in such compositions. For instance, in areas having hard water it has been found that serious difficulties arise because of the effect of hard water on such soaps. Moreover, the use of a soap plus an oleaginous solvent of the type proposed by Harvey presents a constant danger of burning the fruit, particularly where a deep color is desired, since the solvent concentration must be carried at dangerously high levels or excessive dye-bath temperatures must be employed in attempting to get a deep color sufficiently uniform on the peel. Attempts by the art to avoid these difficulties have been largely directed to the replacement of some or all of the oleaginous solvent of the Harvey concentrate with an aqueous solvent for the dye, but such aqueous concentrate compositions have had little or no success in the art due to the fact that they have been deficient in color imparting properties, have given non-uniform coloring and in many cases the dye in such compositions has shown a tendency to crystallize out on shipping or in storage.

The present invention is directed to overcoming the disadvantages of the prior art citrus coloring compositions by providing a novel coloring bath and a novel non-aqueous, non-ionic color concentrate containing a suitable dye and a non-ionic dye solvent or a combination of non-ionic dye solvents capable of dissolving the desired quantity of dye and at the same time having the property, when diluted with water, of providing adequate and uniform color to the peel of citrus fruit at moderate temperatures without building up the dye solvent concentration so high as to damage the fruit.

A further object is to provide a non-aqueous, non-ionic concentrate which, on dilution with water, provides a coloring bath effective to give uniform coloring of citrus fruit without resorting to high coloring bath temperatures.

A further object of the present invention is to provide a non-aqueous, non-ionic citrus fruit coloring concentrate which, on dilution with water, provides a satisfactory coloring bath for imparting an adequate and uniform distribution of color unaffected by the action of hard water.

A still further object is to provide a non-aqueous color concentrate containing a non-ionic surface active agent which is also a dye solvent and an oil-soluble, water-insoluble dye, the finished concentrate being characterized by the fact that the dye will not crystallize out on shipping or in storage.

A still further object is to provide a non-aqueous, non-ionic concentrate for dilution with water to form a coloring bath for citrus fruit, said concentrate consisting essentially of an oil-soluble, water-insoluble dye, a terpene, and a non-ionic surface active solvent for the dye.

A still further object of the present invention is to provide a process for imparting added color to citrus fruit in which a non-aqueous, non-ionic concentrate containing a dye and a surface active dye solvent is first formed and then diluted with water and in which the entire process is carried out without the formation of a soap-containing emulsion.

In producing the concentrate of the present invention it is important to note that we do not rely upon the use of oleaginous dye solvents such as kerosene and the like to put the dye in solution and that our novel concentrate is formed without the use of water, soap, or fatty acid sulfates or sulfonates. The principal components of the concentrate are non-ionic and the concentrate has a very high coloring power even when diluted many times with water. To the best of our knowledge and belief such a non-aqueous, non-ionic concentrate is unique in the fruit coloring art.

In preparing the concentrate of the present invention we use any of the well known oil-soluble, water-insoluble dyes. By way of example, we have referred throughout this specification to the use of a dye known as F. D. & C. No. 32, but it will be understood that other oil-soluble, water-insoluble dyes may be used and it is not intended that our invention should be limited to the particular dyes disclosed herein. Other oil-soluble, water-insoluble dyes which may be used include F. D. & C. Orange No. 2 and F. D. & C. Yellow No. 3 and No. 4. The chemical description of these compounds and other suitable pure food dyes may be found in the Coal-Tar Regulations promulgated by the Administrator of the Federal Security Agency under date of August 27, 1940.

In dissolving the dye to form the color concentrate of the present invention, it is possible to use a non-ionic surface active dye solvent or a mixture of such solvents but we prefer to use a combination of solvents which not only work together to put the dye into solution and to keep it in solution in the concentrate, but also coact in the diluted bath to apply the color to the peel of the fruit in the desired amount in a uniform manner without injuring the peel. The first component of such a solvent combination consists of a terpene material which is a good solvent for the dye and which also acts as a solvent for certain constituents of the peel. This material also has a sufficiently high boiling point so that it is not rapidly lost from the coloring bath at the temperatures normally employed commercially. In the coloring bath concentrations such as hereinafter set forth this terpene component does not injure the peel of the fruit in any way. However, satisfactory and adequate coloring under commercial conditions is not obtained using merely a dye plus a terpene solvent. We therefore use a second solvent component characterized by the fact that it helps to dissolve the dye in the presence of the terpene and at the same time has surface active characteristics and provides a uniform distribution of the dye on the peel without adding further peel dissolving compounds to the coloring bath. This second solvent component consists of a non-ionic polyoxyalkylene or polyether surface active material selected from the groups of said materials hereinafter set forth. The non-ionic material forming this component is either water soluble or water dispersible. While good results can be obtained using a single polyoxyalkylene or polyether material, we have found that under some conditions of use it is desirable to use two or more surface active solvent materials as hereinafter described.

The terpene solvent component used in the combination solvent embodiment of the present invention consists of a terpene or mixture of terpenes selected from the group comprising the monocyclic terpenes and their derivatives and the bicyclic terpenes. As examples of such terpene compounds the following may be mentioned: cymene, bornylene, camphene, carene, dipentene, fenchene, geranene, limonene, myrcene, ocimene, phellandrene, pinene, sabinene, sylvestrene, terpinene and thujene. Certain derivatives of monocyclic terpenes may also be used such as monoterpinyl methyl ether, di-terpinyl methyl ether and the tertiary terpene alcohols. We have found that the terpene known commercially as "Terposol" is particularly useful, but we may employ in addition to or in place of "Terposol" other terpene compounds. The composition commercially known as "Terposol No. 3" is particularly effective. This composition consists of a mixture comprising approximately 60% mono and di-terpinyl methyl ethers with the mono ether in major proportion, and approximately 40% tertiary terpene alcohols. It is manufactured and sold by the Hercules Powder Company of Wilmington, Delaware.

The second non-ionic dye solvent component of the present invention consists of a non-ionic surface active solvent or mixture of non-ionic surface active solvents selected from the group comprising the polyoxyalkylene esters of organic acids, the polyoxyalkylene derivatives of hexitol anhydride or sorbitol esters of fatty acids, polyoxyalkylene ethers, polyoxyalkylene thioethers, alkyl aryl polyether alcohols and polyoxyalkylene derivatives of fatty amides. These components are characterized by the fact that they are water dispersible and surface active but do not ionize in water. For this reason these compounds are designated in this specification as non-ionic, surface active dye solvents. It should be particularly noted that the so-called neutral wetting and dispersing agents such as the higher alkyl sulfates, substituted sulfonic acids and the sulfuric acid derivatives of aliphatic esters are not included within the term non-ionic surface active dye solvents as used in this specification. Such compounds ionize in water and are entirely different both chemically and physically from the non-ionic surface active dye solvents of the present invention.

In addition to the principal components comprising dye, terpene and non-ionic surface active solvent, we may also employ a small proportion, such as 1–10% by weight, of morpholine or similar alkaline materials miscible with or soluble in terpenes of the type used in the practice of the present invention. Such additives serve to inhibit corrosion of metal equipment which may occur under certain conditions of operation.

While in some instances it is possible to attain good coloring results while mixing the constituents of the concentrate in widely varying proportions, we have found generally that preferable dye concentrates according to this invention should contain from 1–10% dye, 20–60% terpene, and 20–70% non-ionic surface active solvent, the percentages being by weight.

The examples set forth below are included in this specification as preferred forms of the present invention, but it is not intended that our invention should be limited in any way to the specific examples given since various changes may be made in the ingredients and in the amounts thereof without departing from the present invention as will be apparent from the equivalent non-ionic surface active solvents listed hereinafter which may be employed either alone or in combination in the practice of the present invention.

EXAMPLE 1

A suitable concentrate for use in preparing a bath for coloring oranges by diluting with water may be prepared using the following ingredients, the parts being by weight:

| | Parts |
|---|---|
| F. D. & C. Red #32 | 7.3 |
| Terposol #3 | 44.67 |
| Polyglycolester of cyclopentanoic acid | 43.82 |
| Morpholine | 4.01 |

The Terposol #3, polyglycolester of cyclopentanoic acid and morpholine are heated together to approximately 160° F. and the dye is then dissolved in a heated mixture with stirring to form the final concentrate.

EXAMPLE 2

Another satisfactory concentrate may be prepared having the following composition, the parts being by weight:

| | Parts |
|---|---|
| F. D. & C. Red #32 | 7.3 |
| Terposol #3 | 45.1 |
| Polyoxyethylene sorbitan monostearate (Tween 60) | 21.8 |
| Polyglycolester of cyclopentanoic acid (Advawet NA6) | 21.8 |
| Morpholine | 4.0 |

The concentrate is prepared following the procedure of Example 1.

EXAMPLE 3

Another satisfactory concentrate may be prepared having the following composition, the parts being by weight:

| | Parts |
|---|---|
| F. D. & C. Red #32 | 7.3 |
| Dipentene | 33.67 |
| Terposol #3 | 11.22 |
| Polyoxyethylene sorbitan monostearate (Tween 60) | 21.9 |
| Polyglycolester of cyclopentanoic acid (Advawet NA6) | 21.9 |
| Morpholine | 4.01 |

The dye is dissolved in a heated mixture of the other ingredients following the procedure of Example 1.

EXAMPLE 4

A concentrate made up essentially of dye and non-ionic, surface active dye solvent may be made up as follows, the parts being by weight:

| | Parts |
|---|---|
| F. D. & C. Red #32 | 3.0 |
| Polyoxyethylene sorbitan monostearate (Tween 60) | 46.45 |
| Polyglycolester of cyclopentanoic acid (Advawet NA6) | 46.45 |
| Morpholine | 4.1 |

The dye is dissolved in a mixture of Tween 60, Advawet NA6 and morpholine heated to 160° F. following the procedure of Example 1.

In using concentrates of the above examples to form coloring baths for imparting color to oranges, the concentrate is mixed with water in the proportion of one part concentrate to about 20 to about 200 parts of water, the parts being by weight. The bath so formed is then heated to treating temperatures well known in the art and the oranges which are to be colored are then brought into contact with the coloring bath for a suitable period depending upon the degree of color desired.

Specific examples of equivalent non-ionic surface active solvent compositions suitable for use alone or in combination in the practice of the present invention appear in the tables set forth below:

*Table A*

POLYOXYALKYLENE ESTERS OF ORGANIC ACIDS

| Commercial Name | Chemical Description | Manufacturer |
|---|---|---|
| Advawet NA 6 | A polyglycol ester of cyclopentanoic acid | Advance Solvent Chem. |
| G-1164 | Polyoxyalkylene glucose tetrastearate | Atlas. |
| G-1165 | Polyoxyalkylene glucose tetraoleate | Do. |
| G-1500 | Blend of G-1165 and G-2149 | Do. |
| G-2000 | Mannitan monopalmitate plus polyoxyethylene mannitan monopalmitate. | Do. |
| G-2149 | Polyoxyethylene stearate | Do. |
| G-2150 | Polyoxyethylene orppylene glycol monostearate | Do. |
| G-2151 | Polyoxyethylene stearate | Do. |
| G-2152 | do | Do. |
| G-2153 | do | Do. |
| G-2160 | Polyoxyethylene propylene glycol stearate | Do. |
| G-2170 | Polyoxyethylene propylene glycol palmitate | Do. |
| Lipal 4 ML | Mono-nonaethylene glycol ester of fatty acids derived from cocoanut oil. | E. F. Drew & Co. |
| Neutronyx 330 | Polyalkyl ether condensate of fatty acids | Onyx Oil & Chem Co. |
| Neutronyx 834 | Fatty acid ester of a polyether alcohol | Do. |
| Nonisol 100 | Polyoxyalkylene fatty ester | Alrose Chem. Co. |
| Nonisol 200 | do | Do. |
| Nonisol 210 | Polyoxyalkylene di fatty esters | Do. |
| Nonisol 300 | do | Do. |
| Nonisol 310 | do | Do. |
| Nopalcol 4-L | Ethylene oxide condensate of a fatty nucleus | Nopco Chem. Co. |
| Nopalcol 6-O | do | Do. |
| | Polyethylene glycol monooleate | Kessler Chem. Co. |
| Neutronyx | Polyalkyl ether condensate of fatty acids | Onyx Oil & Chem. Co. |
| G-1226 | Polyoxyethylene ester of fatty and resin acids | Atlas Powder Co. |
| Ethofat 242/20 and the Ethofat series. | Polyethylene glycol fatty acid esters | Armour and Co. |
| Antarox B-100 | Polyethylene glycol oleate | Antara Products Div. Gen'l Aniline & Film Corp. |
| Emulfors AG | Polyglycol ester of long chain fatty acid | General Dyestuff Corp. |
| G-2145 | Polyoxyethylene stearate | Atlas Powder Co. |
| Intral 224 and Intral 384 and 433. | Long chain fatty acid esters of polyethylene glycol | Synthetic Chems. Co. |
| Kessco 182-D-01 and 182-X-01. | Fatty acid ester of polyethylene glycol | Kessler Chem. Co. |
| Lipal 30 and 60 | Polyethylene glycol ester | E. F. Drew & Co. |
| | Polyethylene glycol 400 oleate R | Kessler Chem. Co. |
| | Polyethylene glycol 400 oleate L Special | Do. |
| Renex | Polyoxyethylene esters of mixed fatty and resin acids | Atlas Powder Co. |
| RN Sol 1 and 2 | Fatty acid ester of polyethylene glycol | Riches-Nelson, Inc. |
| Warco A-162 | Monoester of polyethylene glycol | Warwick Chem. Co. |

Table B
Polyoxyalkylene Derivatives of Hexitol Anhydride or Sorbitol Esters of Fatty Acids

| Commercial Name | Chemical Description | Manufacturer |
|---|---|---|
| G-1096 | Oleic acid derivative of polyoxyethylene sorbitol | Atlas Powder Co. |
| Tween 20 | Sorbitan monolaurate polyoxyethylene derivative | Do. |
| Tween 40 | Monopalmitate of above | Do. |
| Tween 60 | Monostearate of above | Do. |
| Tween 61 | do | Do. |
| Tween 65 | Sorbitan tristearate polyoxyethlene derivative | Do. |
| Tween 80 | The monooleate of sorbitan polyoxyethylene derivative | Do. |
| Tween 81 | Similar to Tween 61—Shorter side chain | Do. |
| Tween 85 | The trioleate of sorbitan polyoxyethylene derivative | Do. |
| Atlox 1045 | Polyoxyethylene sorbitol laurate | Do. |
| Atlox 1045 A | Polyoxyethylene sorbitol oleate laurate | Do. |
| G 931 | Polyoxyethylene sorbitol cottonseed oil derivative | Do. |
| G 1020 | Polyoxyethylene sorbitol monolaurate | Do. |
| G 1061 | Polyoxyethylene sorbitol pentalaurate | Do. |
| G 1086 | Polyoxyethylene sorbitol hexaoleate | Do. |
| G 1234 | Polyoxyethylene sorbitol esters of mixed fatty and resin acids | Do. |
| G 1256 | | |
| G 1266 | | |
| G 2854 | Polyoxyethylene sorbitol tetraoleate | Do. |
| G 2855 | Polyoxyethylene sorbitol pentaoleate | Do. |
| G 2859 | Polyoxyethylene sorbitol 4,5-oleate | Do. |
| G 7106-P | Polyoxyethylene sorbitan trilaurate | Do. |
| G 7426-N | Polyoxyethylene sorbitan monopalmitate | Do. |
| G 7596-J | Polyoxyethylene sorbitan monolaurate | Do. |
| G 8916-P | Polyoxyethylene sorbitan esters of mixed fatty and resin acids | Do. |
| G 8916-T | | |
| G 9446-N | Polyoxyethylene sorbitan monooleate | Do. |
| Tween 21 | Polyoxyethylene sorbitan monolaurate | Do. |

Table C
POLYOXYALKYLENE ETHERS

| Commercial Name | Chemical Description | Manufacturer |
|---|---|---|
| Emulfors ON | Polyethylene ether of long chain fatty alcohol | General Dyestuff Corp. |
| Emulfors ELA | do | Do. |
| Igepal CA | Polymerized ethylene oxide condensation product | Do. |
| Leonil-O | Alkyl polyethylene ether | Do. |
| Nonisol 110 | Polyoxyalkylene | Alrose Chemical Co. |
| Miragene S | Lauroyl amide polyethylene oxide plus a solvent | Miranol Chem. Co. Inc. |
| Neutronyx 600 | Aromatic polyglycol ether | Onyx Oil & Chem. Co. |
| Neutronyx 560 | Identical with 600 but only 83% active materials | Do. |
| Antarox A-180 and A-200 | Aromatic polyglycol ether | Antara Products Div. Gen'l Aniline & Film Corp. |
| Antarox B-290 | Aliphatic polyglycol | Do. |
| Brij 30 and 35 | Polyoxyethylene lauryl alcohol | Atlas Powder Co. |

Table D
POLYOXYALKYLENE THIOETHERS

| Commercial Name | Chemical Description | Manufacturer |
|---|---|---|
| Non-Ionic 218 | Polyethylene glycol tertiary dodecyl thioether | Sharples Chem. Co. |

Table E
ALKYL ARYL POLYETHER ALCOHOLS

| Commercial Name | Chemical Description | Manufacturer |
|---|---|---|
| Triton X45 | Alkyl aryl polyethoxyethanol | Rohm & Haas. |
| Triton X-100 | Alkylated aryl poly ether alcohol | Do. |
| Triton X-120 | Alkylated aryl poly ether alcohol | Do. |
| Triton X-155 | Dimeric Alkylated aryl polyether alcohol | Do. |
| Triton X-166 | Alkylated aryl polyether alcohol | Do. |
| Triton C-50 | do | Do. |

Table F
POLYOXYALKYLENE DERIVATIVES OF FATTY AMIDES

| Commercial Name | Chemical Description | Manufacturer |
|---|---|---|
| Ethomid Series | Fatty amides condensed with ethylene oxide to form various chain lengths. | Armour & Co. |

In addition to the above we have found that particularly good results are obtained through the use of the cocoanut oil fatty acid esters of ethylene oxide condensation products. These esters are non-ionic.

The results obtained by the use of a color bath formed by diluting the concentrate of the present invention with water are far superior to the results heretofore obtainable by the compositions available to the art. For instance, we have found that it is possible by using a coloring bath formed from our concentrate to provide a deep red coloration on oranges without burning the fruit and at the same time it is possible to ship and store the concentrate without undue danger of crystallization or other instability difficulties. These results are obtainable even in geographical areas where it is necessary to use hard water in forming the coloring bath from the concentrate. It appears probable that the interaction of the terpene solvent component and the non-ionic surface active solvent component with the dye prior to dilution and with the peel of the fruit after dilution provide a concentrate stability and a coloring bath efficiency hitherto unobtainable. While conclusive chemical proof is not available, it seems probable that the high coloring efficiency exhibited under conditions of relatively low concentration of terpene solvent is due to the fact that the dye held in solution by the non-ionic surface active solvent is transferred to the peel because of a tendency of the peel constituents to dissolve the terpene. Uniformity of coloring appears to be brought about by the surface active characteristics of the non-ionic solvent component. Whatever the explanation may ultimately prove to be, actual tests in the laboratory and in the field show that the results are greatly superior to any material previously known.

This application is a continuation in part of our previous application filed February 2, 1949 bearing Serial No. 74,252, now abandoned.

Having thus described our invention, we claim:

1. A non-aqueous concentrate for dilution with water to form a coloring bath for citrus fruit, said concentrate consisting essentially of an oil-soluble, water-insoluble dye dissolved in a non-ionic, surface active solvent for said dye selected from the group consisting of the polyoxyalkylene esters of organic acids, the polyoxyalkylene derivatives of hexitol anhydride, the polyoxyalkylene derivatives of sorbitol esters of fatty acids, polyoxyalkylene ethers, polyoxyalkylene thioethers, alkyl aryl polyether alcohols and polyoxyalkylene derivatives of fatty amides.

2. A non-aqueous, non-ionic concentrate for dilution with water to form a coloring bath for citrus fruit, said concentrate consisting essentially of an oil-soluble, water-insoluble dye, and a dye solvent comprising a terpene and a non-ionic surface active polyoxyalkylene derivative.

3. A non-aqueous concentrate for dilution with water to form a coloring bath for citrus fruit, said concentrate consisting essentially of an oil-soluble, water-insoluble dye, and a dye solvent comprising a terpene and a non-ionic surface active polyoxyalkylene organic acid ester.

4. A non-aqueous concentrate for dilution with water to form a coloring bath for citrus fruit, said concentrate consisting essentially of an oil-soluble, water-insoluble dye, a terpene, and a non-ionic surface active polyethylene glycol organic acid ester, said ester being a solvent for said dye.

5. A non-aqueous, non-ionic concentrate for dilution with water to form a coloring bath for citrus fruit, said concentrate consisting essentially of an oil-soluble, water-insoluble dye, a terpene mixture comprising a major part of mono and di-terpinyl ethers and a minor part of tertiary terpene alcohols, the proportion of mono terpinyl ethers exceeding the proportion of di terpinyl ethers, and a non-ionic surface active solvent for said dye, selected from the group consisting of polyoxyalkylene esters of organic acids, the polyoxyalkylene derivatives of hexitol anhydride, the polyoxyalkylene derivatives of sorbitol esters of fatty acids, polyoxyalkylene ethers, polyoxyalkylene thioethers, alkyl aryl polyether alcohols and polyoxyalkylene derivatives of fatty amides.

6. A non-aqueous concentrate for dilution with water to form a coloring bath for citrus fruit said concentrate consisting of an oil-soluble, water-insoluble dye, a dye solvent consisting of a terpene and a non-ionic dye solvent consisting of an ethylene oxide condensation product organic acid ester.

7. A non-aqueous concentrate for dilution with water to form a coloring bath for citrus fruit said concentrate consisting of an oil-soluble, water-insoluble dye, a terpene dye solvent, and a non-ionic dye solvent consisting of a polyglycol ester of cyclopentanoic acid.

8. A non-aqueous concentrate for dilution with water to form a coloring bath for citrus fruit said concentrate consisting of an oil-soluble, water-insoluble dye, a terpene dye solvent, and a non-ionic dye solvent consisting of a mixture of a polyglycol ester of cyclopentanoic acid and a long chain aliphatic fatty acid ester of a polyoxyalkylene product.

9. A non-aqueous concentrate for dilution with water to form a coloring bath for citrus fruit said concentrate consisting of an oil-soluble, water-insoluble dye, dipentene, a polyglycol ester of cyclopentanoic acid, and a sorbitan monostearate polyoxyalkylene derivative.

10. A non-aqueous concentrate for dilution with water to form a coloring bath for citrus fruit said concentrate consisting of an oil-soluble, water-insoluble dye, dipentene, a terpene derivative dye solvent comprising a mixture of mono-terpinyl methyl ether, di-terpinyl methyl ether and tertiary terpene alcohols, and a non-ionic dye solvent consisting of a mixture of polyoxyalkylene sorbitan monostearate and a polyglycol ester of cyclopentanoic acid.

11. A non-aqueous concentrate for dilution with water to form a coloring bath for citrus fruit said concentrate consisting of an oil-soluble, water-insoluble dye, dipentene and a non-ionic dye solvent consisting of ethylene oxide condensation cocoanut oil fatty acid ester.

12. A non-aqueous concentrate for dilution with water to form a coloring bath for citrus fruit said concentrate consisting of an oil-soluble, water-insoluble dye, a dye solvent consisting of a terpene, a non-ionic dye solvent consisting of an ethylene oxide condensation product organic acid ester and a minor proportion of morpholine.

13. In a process for imparting color to citrus fruit the steps comprising dissolving an oil-soluble, water-insoluble dye in a non-aqueous solvent comprising a mixture of a terpene and a non-ionic dye solvent consisting of an ethylene oxide condensation product organic acid ester, diluting the concentrate with water, heating the coloring bath thus formed, and contacting citrus fruit with the heated coloring bath.

14. In a process for imparting color to citrus fruit, the steps comprising dissolving an oil-soluble, water-insoluble dye in a non-aqueous solvent comprising a mixture of a terpene and a non-ionic surface active solvent for said dye selected from the group consisting of polyoxyalkylene esters of organic acids, the polyoxyalkylene derivatives of hexitol anhydride, the polyoxyalkylene derivatives of sorbitol esters of fatty acids, polyoxyalkylene ethers, polyoxyalkylene thioethers, alkyl aryl polyether alcohols and polyoxyalkylene derivatives of fatty amides thereby forming a dye concentrate, diluting the concentrate with water, heating the coloring bath thus formed, and then contacting citrus fruit with the heated coloring bath.

15. In a process for imparting color to citrus fruit, the steps comprising dissolving an oil-soluble, water-insoluble dye in a non-aqueous solvent comprising a mixture of a terpene and a non-ionic surface active solvent for said dye selected from the group consisting of polyoxyalkylene esters of organic acids, the polyoxyalkylene derivatives of hexitol anhydride, the polyoxyalkylene derivatives of sorbitol esters of fatty acids, polyoxyalkylene ethers, polyoxyalkylene thioethers, alkyl aryl polyether alcohols and polyoxyalkylene derivatives of fatty amides, thereby forming a dye concentrate, diluting the concentrate with 20-200 parts by weight of water per part by weight of concentrate, heating the coloring bath thus formed, and then contacting the citrus fruit with the heated coloring bath.

16. A concentrate for dilution with water to form a coloring bath for citrus fruit comprising an oil-soluble, water-insoluble dye, a terpene selected from the class comprising the mono- and di-terpinyl ethers, and a non-ionic surface active dye solvent selected from the group comprising the polyoxyalkylene esters of organic acids, polyoxyalkylene derivatives of hexitol anhydride, polyoxyalkylene or sorbitol esters of fatty acids, polyoxyalkylene ethers, polyoxyalkylene thioethers, alkyl aryl polyether alcohols, and polyoxyalkylene derivatives of fatty amides.

17. A coloring bath for citrus fruit comprising water, an oil soluble, water insoluble dye, and a non-ionic, surface active solvent for said dye selected from the group consisting of polyoxyalkylene esters of organic acids, the polyoxyalkylene derivatives of hexitol anhydride, the polyoxyalkylene derivatives of sorbitol esters of fatty acids, polyoxyalkylene ethers, polyoxyalkylene thioethers, alkyl aryl poly ether alcohols and polyoxyalkylene derivatives of fatty amides.

18. The coloring bath of claim 17 further characterized by the presence of a terpene.

GEORGE J. HAUSMANN.
BAYARD S. JOHNSON.
CHARLES W. McDERMOTT.

REFERENCES CITED

The following references are of record in the file of this patent:

UNITED STATES PATENTS

| Number | Name | Date |
|---|---|---|
| 2,133,064 | Ulrey | Oct. 11, 1938 |
| 2,133,404 | Sharma | Oct. 18, 1938 |
| 2,324,407 | Smith | July 13, 1943 |